United States Patent
Harigaya et al.

(10) Patent No.: US 6,221,557 B1
(45) Date of Patent: *Apr. 24, 2001

(54) OPTICAL INFORMATION RECORDING MEDIUM

(75) Inventors: Makoto Harigaya, Hiratsuka; Yoshiyuki Kageyama, Yokohama; Hiroko Iwasaki, Tokyo; Michiaki Shinotsuka, Hiratsuka, all of (JP)

(73) Assignee: Ricoh Company, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/807,632

(22) Filed: Feb. 27, 1997

(30) Foreign Application Priority Data

Feb. 27, 1996 (JP) .................................................. 8-040205

(51) Int. Cl.⁷ ....................................................... G11B 7/24
(52) U.S. Cl. ................ 430/270.13; 430/945; 369/275.5; 369/275.2; 428/64.5; 428/64.6
(58) Field of Search ................................. 428/64.6, 64.5, 428/64.4; 369/275.5, 275.2; 430/945, 270.13, 273.1, 275.1

(56) References Cited

U.S. PATENT DOCUMENTS

| | | | |
|---|---|---|---|
| 4,954,379 | * 9/1990 | Nishida et al. | 430/270.13 |
| 5,011,723 | 4/1991 | Harigaya et al. | 420/945 |
| 5,024,927 | 6/1991 | Yamada et al. | 430/945 |
| 5,080,947 | 1/1992 | Yamada et al. | 430/945 |
| 5,100,700 | 3/1992 | Ide et al. | 428/64.4 |
| 5,156,693 | 10/1992 | Ide et al. | 148/403 |
| 5,453,346 | 9/1995 | Kawahara et al. | 430/273.1 |
| 5,470,628 | 11/1995 | Tominaga et al. | 428/64.4 |

FOREIGN PATENT DOCUMENTS

| | | |
|---|---|---|
| 0 564 260 | 10/1993 | (EP) . |
| 0 574 025 | 12/1993 | (EP) . |
| 0 630 007 | 12/1994 | (EP) . |
| 0 639 830 | 2/1995 | (EP) . |
| 0 706 176 | 4/1996 | (EP) . |
| 0 706 179 | 4/1996 | (EP) . |
| 0 717 404 | 6/1996 | (EP) . |
| 0 745 975 | 12/1996 | (EP) . |
| 2-103747 | * 4/1990 | (JP) . |
| 3-128282 | * 5/1991 | (JP) . |
| 5-073959 | * 3/1993 | (JP) . |
| 6-325406 | * 11/1995 | (JP) . |

OTHER PUBLICATIONS

Japanese Journal of Applied Physics, vol. 32, No. 5A, Part 1, pp. 1980–1982, May 1, 1993, Junki Tominaga, et al., "V and Ti Doping Effect on In–Ag–Te–Sb Optical Phase Change Rewritable Disc".

* cited by examiner

Primary Examiner—Martin Angebranndt
(74) Attorney, Agent, or Firm—Oblon, Spivak, McClelland, Maier & Neustadt, P.C.

(57) ABSTRACT

An optical information recording medium includes a substrate with guide grooves thereon, a recording layer provided on the substrate, including a recording material of which phase is reversibly changeable from a stable state to a semistable state and vice versa, a heat-resistant dielectric protective layer provided on the recording layer, including a protective material which includes Zn, Si, S and O, and a light reflection and heat dissipation layer provided on the heat-resistant dielectric protective layer.

6 Claims, 1 Drawing Sheet

OPTICAL INFORMATION RECORDING MEDIUM

BACKGROUND OF THE INVENTION

1. Field of the Invention

The present invention relates to an optical information recording medium, more particularly to a phase-change type optical information recording medium.

2. Discussion of Background

There is conventionally known a phase-change type optical information recording medium which utilizes phase changes between a crystalline phase and an amorphous phase or between one crystalline phase and another crystalline phase as one of the optical recording media which are capable of recording, reproducing and erasing information, for instance, by the application of a laser beam thereto. This kind of phase-change type optical information recording medium is capable of overwriting information by the application of a single laser beam thereto.

Such a phase-change type optical information recording medium is generally composed of a substrate made of polycarbonate, a first protective layer provided on the substrate, a recording layer provided on the first protective layer, a second protective layer provided on the recording layer, and a light reflection and heat dissipation layer.

Representative examples of recording materials for use in the above-mentioned recording layer are the so-called chalcogen-based alloys, such as Ge-Te, Ge-Se-Sb and Ge-Te-Sn as disclosed in U.S. Pat. No. 3,530,441, and Ge-Te-Se-Sb and Ge-Te-Sb, with the composition ratios of such elements being specifically selected for improvement of the recording/erasing repetition performance thereof as proposed in Japanese Laid-Open Patent Applications 62-73438 and 63-228433.

Furthermore, as the materials for the above-mentioned protective layers, there are conventionally known oxides such as SiO and $Al_2O$, and nitrides such as BN, $Si_3N_4$ and AlN.

However, protective layers composed of such an oxide or nitride are known to have the shortcoming that the protective layers are thermally damaged by the heat applied thereto during the cycles of heating with the application of a laser beam and cooling, resulting in the reduction of the reliability of the performance of the optical information recording medium comprising such a protective layer.

In order to eliminate the above-mentioned shortcoming, mixed materials, such as a material composed of ZnS and $SiO_2$, are proposed as disclosed in Japanese Laid-Open Patent Application 63-259855 and Japanese Patent Publication 4-74785. It is reported that by using such a material in the protective layer, the above-mentioned recording/erasing repetition performance can be significantly improved for high line speed recording media, but the recording/erasing repetition performance cannot be sufficiently improved for low line speed recording media such as compact disks.

SUMMARY OF THE INVENTION

It is therefore a first object of the present invention to provide a phase-change type optical information recording medium with high heat resistance.

A second object of the present invention is to provide a phase-change type optical information recording medium which has excellent recording, reproduction and erasing repetition performance (hereinafter referred to as repetition use performance), and high recording sensitivity.

A third object of the present invention is to provide a phase-change type optical information recording medium which has excellent repetition use performance, in particular, from low line speed operation through high line-speed operation.

These objects of the present invention can be achieved by an optical information recording medium comprising (a) a substrate with guide grooves thereon, (b) a recording layer provided on the substrate, comprising a recording material of which phase is reversibly changeable from a stable state to a semistable state and vice versa, (c) a heat-resistant dielectric protective layer provided on the recording layer, comprising a protective material which comprises Zn, Si, S and O, and (d) a light reflection and heat dissipation layer which is provided on the heat-resistant dielectric protective layer.

The desired heat resistance can be obtained by use of the above-mentioned heat-resistant dielectric protective layer. When the substrate is not sufficiently heat resistant for use in practice, an additional heat-resistant dielectric protective layer which may be the same as the above-mentioned heat-resistant dielectric protective layer may be provided between the substrate and the recording layer.

In the above optical information recording medium, it is preferable that the protective material for the heat-resistant dielectric protective layer comprise ZnS, ZnO and $SiO_2$.

Furthermore, in the above protective material, it is preferable that the composition ratio of ZnS, ZnO and $SiO_2$ be such that the composition ratio thereof be represented by formula (I) in order to obtain excellent repetition use performance, in particular, from low line speed operation through high line speed operation:

$$(ZnS)_\alpha (ZnO)_\beta (SiO_2)_\gamma \quad \text{(I)}$$

provided that $30 \leq \alpha \leq 90$, $55 \leq \beta \leq 50$, and $5 \leq \gamma \leq 30$, and $\alpha+\beta+\gamma=100$ mole %.

Furthermore, for achieving the above-mentioned object, it is also preferable that the protective material have a thermal conductivity in a range of 1.2 W/m·k to 24.0 W/m·k.

For obtaining a phase-change type optical information recording medium having excellent repetition use performance and high recording sensitivity, it is preferable that the recording material for the recording layer comprise Ag, In, Sb and Te.

Furthermore, it is preferable that the recording material for the recording layer further comprise at least one element selected from the group consisting of N and Cl.

Furthermore, it is preferable that the recording material for the recording layer comprise Ag, S, one of Sb or As, and at least one element selected from the group consisting of Zn, Si, Ge and Sn.

For achieving the above-mentioned objects, it is also preferable that the recording material for the recording layer comprise Ag and St and one element selected from the group consisting of Sb and As and be present in the form of $Ag_3SbS_3$ or $Ag_3AsS_3$ in a crystalline state in the stable state, and in an amorphous state in the somistable state.

In the above, it is preferable that the recording material be in an amorphous state in the semistable state, and initialization and erasing be performed in the crystalline state.

In the above, it is also preferable that the recording layer comprise $Ag_3SbS_3$ or $Ag_3AsS_3$ in the stable state, with at least one element selected from the group consisting of Zn, Si, Ge and Sn being added thereto.

Furthermore, in the above, it is preferable that the recording layer comprise a compound of formula (II) or a compound of formula (III):

$$(Ag_3SbS_3)_x M_{100-x} \quad (II)$$

wherein M represents an element selected from the group consisting of Zn, Go, Si and Sn, and $92 \leq X \leq 99$, X indicating mole %; and $$(Ag_3AsS_2)_x M_{100-x} \quad (III)$$

wherein M represents an element selected from the group consisting of Zn, Ge, Si and Sn, and $92 \leq X \leq 99$, X indicating mole %.

BRIEF DESCRIPTION OF THE DRAWINGS

A more complete appreciation of the invention and many of the attendant advantages thereof will be readily obtained an the same becomes better understood by reference to the following detailed description when considered in connection with the accompanying drawings, wherein.

DESCRIPTION OF THE PREFERRED EMBODIMENTS

Figure 1:
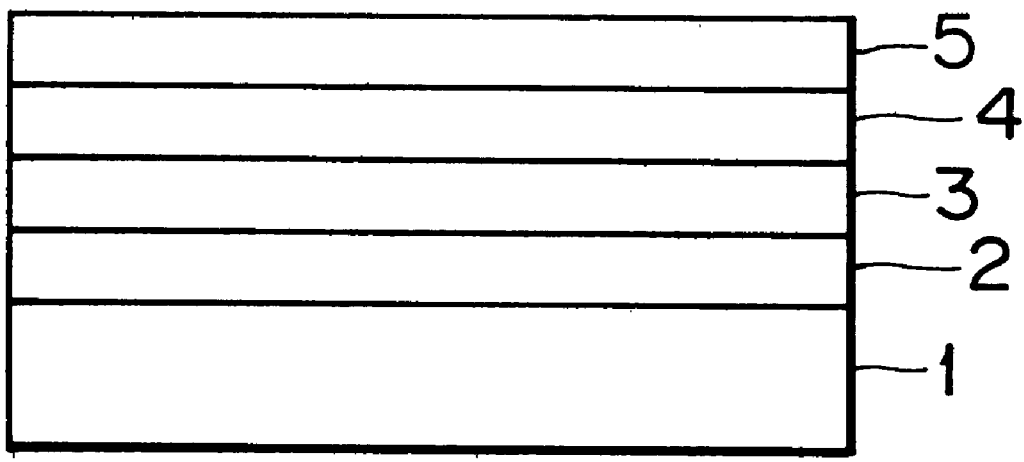
FIG. 1 is a schematic cross-sectional view of an example of an optical information recording medium of the present invention.

In the phase-change type optical recording medium, the recording layer is fused by the application of a laser beam thereto and cooled for solidification for recording, reproduction and erasing. This fusing and cooling cycle is repeated, so that the material in the recording layer is caused to flow during the repetition of the fusing and cooling cycle. As a result, it may occur that the heat-resistant layer is peeled off the recording layer or cracks are formed in the heat-resistant layer by thermal shocks during the repetition of the fusing and cooling cycle, resulting in considerable deterioration of the phase-change type optical information recording medium (hereinafter referred to as the optical information recording medium).

In particular, the heat-resistant protective layer for the optical information recording medium is required to control the quantity of heat generated and accumulated in the recording layer by the application of laser beam thereto, and therefore plays a significantly important role for forming excellent recording marks with minimum litters and for achieving high operation reliability in the course of repeated use of the optical information recording medium.

The heat-resistant protective layer capable of playing the above-mentioned role is required to have the following properties:

(1) having high resistance against thermal shocks.
(2) capable of controlling the thermal conductivity of the heat-resistant protective layer an desired.
(3) having an appropriate refractive index for having the recording layer absorb laser beam effectively.
(4) chemically stable.

The optical information recording medium of the present invention is of a phase-change type and capable of recording information therein and erasing recorded information therefrom and being initialized before use, and comprises a substrate with guide grooves thereon; a recording layer provided on the substrate, comprising a recording material of which phase la reversibly changeable from a stable state to a semistable state and vice versa; a heat-resistant dielectric protective layer provided on the recording layer, comprising a protective material which comprises Zn, Si, S and O; and a light reflection and heat dissipation layer provided on the heat-resistant dielectric protective layer.

As mentioned previously, in the above, when the substrate is not sufficiently heat resistant, an additional heat-resistant dielectric protective layer comprising the same protective material as mentioned above may be interposed between the substrate and the recording layer.

In the present invention, it is particularly preferable that the above-mentioned protective material for use in the heat-resistant dielectric layer be a mixture of ZnS, ZnO and $SiO_2$.

$SiO_2$ is known as a heat-resistant material which in highly resistant to thermal shocks. However, when $SiO_2$ is used alone in the above-mentioned heat-resistant protective layer, since the thermal coefficient of expansion of $SiO_2$ is much smaller than that of the recording layer, so that the heat-resistant protective layer made of $SiO_2$ tends to peel off the recording layer while in use. In order to solve this problem, it is proposed to use a mixture of $SiO_2$ and ZnS as disclosed in Japanese Laid-Open Patent Application 63-259855 and Japanese Patent Publication 7-111786. It is reported that the mixture of $SiO_2$ and ZnS exhibits excellent properties in terms of the thermal coefficient of expansion. However, the thermal conductivity of the mixture of $SiO_2$ and ZnS is as small as 1 w/m·k, which is considered to be much smaller than the thermal conductivities of other materials for use in the heat-resistant protective layer.

When a heat-resistant protective layer having such a small thermal conductivity is used in an optical information recording medium for compact disks for use at a low line speed, heat dissipation is not sufficient for repeated use due to the small thermal conductivity and therefore the repeated operation characteristics and mark jitter characteristics tend to deteriorate while in repeated use.

In the present invention, ZnO is added to the mixture of $SiO_2$ and ZnS in order to increase the thermal conductivity.

Furthermore, the refractive index of the mixture of $SiO_2$ and ZnS is 2.1, while the refractive index the mixture of Sis,, ZnS and ZnO is 1.9. Thus, by the addition of ZnO, the refractive index of the heat-resistant protective layer can be decreased, so that the light enclosing effect of the recording layer which is interposed between the substrate and the heat-resistant protective layer or between a pair of the heat-resistant protective layers is increased. As a result, the laser beam applied to the recording layer is more efficiently and effectively used, so that the recording sensitivity of the recording layer can be increased.

In order to fabricate a phase-change type optical information recording medium which can be employed with high operation reliability and excellent repetition use performance in a low line speed range through a high line speed range, the inventors of the present invention have experimentally confirmed that it is preferable to set the thermal conductivity of the heat-resistant protective layer or that of the protective material used in the heat-resistant protective layer in the range of 1.2 w/m·k to 24.0 w/m·k.

In the present invention, the above-mentioned thermal conductivity can be attained when the composition ratio of ZnS, ZnO and $SiO_2$ in the heat-resistant dielectric protective layer is set as represented by formula (I):

$$(ZnS)_\alpha (ZnO)_\beta (SiO_2)_\gamma \quad (I)$$

wherein $30 \leq \alpha \leq 90$, $5 \leq \beta \leq 50$, and $5 \leq \gamma \leq 30$, and $\alpha + \beta + \gamma = 100$ mole %.

By adjusting the composition ratio of ZnS, ZnO and $SiO_2$ in the heat-resistant dielectric protective layer and accordingly by adjusting the thermal conductivity of the heat-resistant protective layer, the repetition use performance of rewritable CD-RW and DVD-RAM compact disks can be significantly improved. This can be attained by the addition of ZnO to the mixture of $SiO_2$ and ZnS as mentioned above.

In the present invention, it is preferable that the recording material comprising Ag, In, Sb and To be employed, more preferably with the addition thereto of at least one element selected from the group consisting of N and Cl. The addition of a nitrogen atom improves the repetition use performance of the recording material, while the addition of a chlorine atom increases the light absorption performance of the recording material and therefore improves the recording sensitivity of the recording material.

By use of the above recording material in the recording layer in combination with the above-mentioned the heat-resistant protective layer, the recording sensitivity and repetition use performance of the optical information recording medium can be significantly improved.

Ag-In-Sb-Tb recording materials are proposed as recording materials having high recording sensitivity a 1 high erasing performance in overwriting as disclosed in Japanese Laid-Open Patent Applications 2-37466, 2-171325 and 4-141485. However, when the recording layer composed of the above-mentioned Ag-In-Sb-Tb recording material is used in combination with the conventional $ZnS·SiO_2$ protective layer, the repetition use performance of the recording layer is not sufficient for use in compact disks used in a low line speed range.

For achieving the above-mentioned advantages of the present invention over the conventional optical information recording media, the recording material for use in the optical information recording medium of the present invention comprise Ag, S, one of Sb or As, and at least one element selected from the group consisting of Zn, Si, Go and Sn.

The above-mentioned recording material may be present in the form of $Ag_3SbS_3$ or $Ag_3AsS_3$ in a crystalline state in the stable state and in an amorphous state in the semistable state.

Furthermore, in the present invention, recording can be performed in the amorphous state, and initialization and erasing can be performed in the crystalline state.

Furthermore, the recording layer may comprise $Ag_3SbS_3$ or $Ag_3AsS_3$ in the stable state, with at least one element selected from the group consisting of Zn, Si, Ge and Sn being added thereto.

In the above, Zn serves as a donor and Si, Ge and Sn serve as an acceptor.

Furthermore, the recording layer may comprise a compound of formula (II) or a compound of formula (III):

$$(Ag_3SbS_3)_xM_{100-x} \qquad (II)$$

wherein M represents at least one element selected from the group consisting of Zn, Ge, Si and Sn, and $92 \leq X \leq 99$, X indicating mole %; and

$$(Ag_3S_3)_xM_{100-x} \qquad (III)$$

wherein M represents at least one element selected from the group consisting of Zn, Go, Si and Sn, and $92 \leq X \leq 99$, X indicating mole %.

With reference to FIG. 1, the structure of an example of the optical information recording medium of the present invention will now be explained.

In FIG. 1, on a substrate 1, there are successively overlaid a first heat-resistant protective layer 2, a recording layer 3, a second heat-resistant protective layer 4 and a light reflection and heat dissipation layer 5. As mentioned previously, it is not always necessary to provide a pair of the first and second heat-resistant protective layers between which the recording layer is to be interposed. However, when the substrate 1 is not heat resistant, for example, when the substrate 1 is made of polycarbonate, it is preferable to provide the first heat-resistant protective layer 2 as illustrated in FIG. 1.

Examples of the materials for the substrate 1 are glass, ceramics and resins. In view of moldability and cost, a substrate made of a resin is preferable for use in the present invention.

Representative examples of resins for the substrate 1 are polycarbonate resin, acrylic resin, polystyrene resin, acrylonitrile-styrene copolymer resin, poly-ethylene resin, polypropylene resin, silicone resin, fluorine plastics, ABS resin and urethane resin. Of these resins, polycarbonate resin is most preferable in view of the workability and optical characteristics thereof The substrate 1 may be in the shape of a disk, a card or a sheet.

The heat-resistant protective layers 2 and 4 for use in the present invention are dielectric layers and serve not only as heat-resistant protective layer, but also as optical interference layer. In order to have the protective layer serve as a suitable heat-resistant protective layer for use in the present invention, without causing the problem of peeling off the substrate or the recording layer, it is preferable that the heat-resistant protective layer have a thickness in the range of 200 Å to 3000 Å, more preferably in the range of 350 Å to 2000 Å.

The heat-resistant protective layer for use in the present invention can be formed by sputtering, using a $ZnS·ZnO \quad SiO_2$ target.

The recording layer for use in the present invention can also be formed by sputtering. It is preferable that the recording layer have a thickness in the range of 100 Å to 1000 Å, more preferably in the range of 200 Å to 350 Å, in order to maintain appropriate light absorption performance and interference effect without reducing light transmittance thereof.

The light reflection and heat dissipation layer can be made of, for example, an aluminum alloy. The light reflection and heat dissipation layer can also be formed by sputtering. It is preferable that the light reflection and heat dissipation layer have a thickness in the range of 500 Å to 2000 Å, more preferably in the range of 700 Å to 1500 Å.

Other features of this invention will become apparent in the course of the following description of exemplary embodiments, which are given for illustration of the invention and are not intended to be limiting thereof.

EXAMPLES 1 to 13

On a disk-shaped polycarbonate substrate with a diameter of 120 mm and a thickness of 1.2 mm, with guide grooves with a pitch of 1.6 μm and a depth of about 600 Å being formed thereon, there were successively overlaid a first heat-resistant protective layer, a recording layer, a second heat-resistant protective layer, and a light reflection and heat dissipation layer by rf sputtering method.

The composition and thickness of each of the first heat-resistant protective layer, the recording layer, the second heat-resistant protective layer, and the light reflection and heat dissipation layer are shown in TABLE 1.

Thus, phase-change type optical recording media No. 1 to No. 13 of the present invention were respectively fabricated in Examples 1 to 13. In each of these phase-change type optical recording media, the first heat-resistant protective layer and the second heat-resistant protective layer have the same composition as shown in TABLE 1.

Comparative Example 1

The procedure of fabrication of the phase-changeable optical recording medium No. 1 in Example 1 was repeated except that the first and second heat-resistant protective layers employed in Example 1 were respectively replaced by a first heat-resistant protective layer with the composition as shown in TABLE 1, and a second heat-resistant protective layer with the composition as shown in TABLE 1, whereby a comparative phase-change type optical recording medium No. 1 was fabricated.

Comparative Example 2

The procedure of fabrication of the phase-changeable optical recording medium No. 10 in Example 10 was repeated except that the first and second heat-resistant protective layers employed in Example 10 were respectively replaced by a first heat-resistant protective layer with the composition as shown in TABLE 1, and a second heat-resistant protective layer with the composition as shown in TABLE 1, whereby a comparative phase-change type optical recording medium No. 2 was fabricated.

In each of the above comparative phase-change type optical recording media, the first heat-resistant protective layer and the second heat-resistant protective layer have the same composition as shown in TABLE 1.

Test samples with a thickness of 1 μm were prepared from the heat-resistant protective layers employed in Examples 1 to 13 and Comparative Example 1 and 2. Using these test samples, the thermal conductivity (w/m·k) of each of the heat-resistant protective layers employed in Examples 1 to 13 and Comparative Example 1 and 2 was measured by an optical alternate-current (A.C.) method.

Also using the same test samples, the thermal conductivity of each of the heat-resistant protective layers employed in Examples 1 to 13 and Comparative Example 1 and 2 was measured, using Ellipso Meter.

The results are shown in TABLE 2.

The thus obtained optical information recording media No. 1 to No. 9 of the present invention and comparative optical information recording medium No. 1 were evaluated by the following evaluation method A:

Evaluation Method A

Each of the above-mentioned optical information recording media was initialized and then subjected to overwriting with an EFM random pattern at a line speed of 1.4 m/s repeatedly. Thereafter, each optical information recording medium was evaluated with respect to the recording power dependence of 3T signals by reproduction of the overwritten EPM random pattern. The line speed at the reproduction was 2.8 m/s.

The results are shown in TABLES 3 to 12.

With respect to the comparative optical information recording medium No. 1 in Comparative Example 1, the number of repeatable overwriting times thereof was 1000 as shown in TABLE 12. In sharp contrast, with respect to the optical information recording media No. 1 to No. 9 of the present invention in Examples 1 to 9, the number of repeatable overwriting times was more than 3000.

It is considered that this is because the thermal conductivity of each of heat-resistant protective layers employed in the optical information recording media No. 1 to No. 9 of the present invention in Examples 1 to 9 is greater than that of each heat-resistant protective layer employed in the comparative optical information recording medium No. 1 in Comparative Example 1, so that the recording layers in the optical information recording media No. 1 to No. 9 were thermally less damaged than the recording layer in the comparative optical information recording medium No. 1 in Comparative Example 1. in particular, when the content ratio of ZnO is 5 mol % or more, the above-mentioned effect becomes conspicuous.

In Example 2, the content ratio of ZnO is greater than that in Example 1, so that the thermal conductivity of each heat-resistant protective layer in Example 2 is increased in comparison with the thermal conductivity of each heat-resistant protective layer in Example 1, so that 5,000 to 10,000 times overwriting was possible in the optical information recording medium No. 2 in Example 2.

In Example 3, the ZnO content ratio in each heat-resistant protective layer is 20 mole %, so that the thermal conductivity of each heat-resistant protective layer in Example 3 is increased to 11.9 W/m·k. As a result, the heat dissipation effect of each heat-resistant protective layer in Example 3 is greater than that of each heat-resistant protective layer in Example 2, but the recording sensitivity at relatively low recording powers is slightly lowered. However, the number of repeatable overwriting times is increased up to 15,000.

In Example 4, the ZnO content ratio in each heat-resistant protective layer is 30 mole %, so that the thermal conductivity of each heat-resistant protective layer in Example 4 is increased to 14.8 W/m·k. As a result, the heat dissipation effect of each heat-resistant protective layer in Example 4 is increased, so that the recording sensitivity at relatively low recording powers is slightly lowered. However, the number of repeatable overwriting times is increased up to 20,000.

In Example 5, the ZnO content ratio in each heat-resistant protective layer is 50 mole %, so that the thermal conductivity of each heat-resistant protective layer in Example 5 is increased to 23.8 W/m·k. Accordingly the heat dissipation effect of the heat-resistant protective layer in Example 5 is increased, so that the recording sensitivity at relatively low recording powers is slightly lowered. However, the number of repeatable overwriting times is increased up to 30,000 or more.

When the ZnO content ratio exceeds 50 mole %, the thermal conductivity of the heat-resistant protective layer is further increased and therefore the recording sensitivity at relatively low recording powers is further lowered. Therefore, the ZnO content ratio of more than 50 mole % is not always useful in practice.

In Example 6, the ZnO content ratio in each heat-resistant protective layer is 20 mole %, so that the thermal conductivity of the heat-resistant protective layer in Example 6 is smaller than that of the heat-resistant protective layer in Example 5. However, the number of repeatable overwriting times is 20,000 or more.

In Example 7, the optical information recording medium No. 7 thereof was fabricated in the same manner as in Example 3 except that the recording layer in Example 3 was replaced by a recording layer which was modified so as to include a nitrogen atom in the recording layer in Example 3.

The number of repeatable overwriting times of the optical information recording medium No. 3 in Example 3 was 15,000, while the number of repeatable overwriting times of the optical information recording medium No. 7 in Example 7 was 30,000. This indicates that the addition of nitrogen to the recording layer improves the number of repeatable overwriting times of the optical information recording medium No. 7.

In Example 8, the optical information recording medium No. 8 thereof was fabricated in the same manner as in Example 3 except that the recording layer in Example 3 was replaced by a recording layer which was modified so as to include a chlorine atom in the recording layer in Example 3.

The number of repeatable overwriting times of the optical information recording medium No. 3 in Example 3 was 15,000, and the number of repeatable overwriting times of the optical information recording medium No. 8 in Example 8 was also 15,000. However, TABLE 10 indicates that the recording sensitivity of the optical information recording medium No. 8 in Example 8 is higher than that of the optical information recording medium No. 3 in Example 3. This indicates that the addition of chlorine to the recording layer improves the recording sensitivity without having any adverse effect on the number of repeatable overwriting times of the optical information recording medium No. 8.

The previously obtained optical information recording media No. 10 to No. 13 of the present invention and comparative optical information recording medium No. 2 were evaluated by the following evaluation method B:

Evaluation Method B

Each of the above-mentioned optical information recording media was initialized. Recording was performed at a line speed of 1.2 m/s and a recording frequency (f1) of 0.4 MHZ, and then overwriting was performed with a recording frequency (f2) of 0.72 MHZ, using a recording laser with a wavelength of 780 nm. The C/N (dβ), the erasing ratio (dβ), the reflectivity of an erased portion, the reflectivity of a recorded portion, the contrast, and the number of repeatable overwriting times were measured. The results are shown in TABLE 13.

The results shown in TABLE 13 indicate that the use of the heat-resistant protective layer composed of $(ZnS)_{70}(ZnO)_{10}(SiO_2)_{20}$ for both the first and second heat-resistant protective layers improves the recording sensitivity and the number of repeatable overwriting times. In particular, in Example 13, the recording layer includes not only $Ag_3SbS_3$, but also both Zn and Sn. In this recording layer, Zn serves as a donor and Sn serves as an acceptor, so that two energy levels are formed, which enhances the light absorption. Thus, the use of such recording layer significantly improves not only the recording sensitivity, but also the number of repeatable overwriting times.

TABLE 1

| | Composition | Thickness (Å) |
|---|---|---|
| Example 1 | | |
| First Heat-resistant Protective Layer | $(ZnS)_{30}(ZnO)_5(SiO_2)_5$ (mol %) | 1500 |
| Recording Layer | $Ag_4In_{10}Sb_{47}Te_{30}$ (atm %) | 200 |
| Second Heat-resistant Protective Layer | $(ZnS)_{30}(ZnO)_5(SiO_2)_5$ (mol %) | 250 |
| Light Reflection and Heat Dissipation Layer | Al alloy | 1000 |
| Example 2 | | |
| First Heat-resistant Protective Layer | $(ZnS)_{30}(ZnO)_{10}(SiO_2)_{10}$ (mol %) | 1500 |
| Recording Layer | $Ag_5In_{10}Sb_{47}Te_{30}$ (atm %) | 200 |

TABLE 1-continued

| | Composition | Thickness (Å) |
|---|---|---|
| Second Heat-resistant Protective Layer | $(ZnS)_{70}(ZnO)_{10}(SiO_2)_{20}$ (mol %) | 250 |
| Light Reflection and Heat Dissipation Layer | Al alloy | 1000 |
| Example 3 | | |
| First Heat-resistant Protective Layer | $(ZnS)_{70}(ZnO)_{20}(SiO_2)_{10}$ (mol %) | 1800 |
| Recording Layer | $Ag_5In_{10}Sb_{47}Te_{30}$ (atm %) | 200 |
| Second Heat-resistant Protective Layer | $(ZnS)_{70}(ZnO)_{20}(SiO_2)_{10}$ (mol %) | 275 |
| Light Reflection and Heat Dissipation Layer | Al alloy | 1000 |
| Example 4 | | |
| First Heat-resistant Protective Layer | $(ZnS)_{50}(ZnO)_{30}(SiO_2)_{20}$ (mol %) | 2000 |
| Recording Layer | $Ag_5In_{10}Sb_{47}Te_{30}$ (atm %) | 200 |
| Second Heat-resistant Protective Layer | $(ZnS)_{50}(ZnO)_{30}(SiO_2)_{20}$ (mol %) | 325 |
| Light Reflection and Heat Dissipation Layer | Al alloy | 800 |
| Example 5 | | |
| First Heat-resistant Protective Layer | $(ZnS)_{30}(ZnO)_{50}(SiO_2)_{20}$ (mol %) | 2000 |
| Recording Layer | $Ag_5In_{10}Sb_{47}Te_{30}$ (atm %) | 200 |
| Second Heat-resistant Protective Layer | $(ZnS)_{30}(ZnO)_{50}(SiO_2)_{20}$ (mol %) | 350 |
| Light Reflection and Heat Dissipation Layer | Al alloy | 800 |
| Example 6 | | |
| First Heat-resistant Protective Layer | $(ZnS)_{50}(ZnO)_{20}(SiO_2)_{20}$ (mol %) | 1800 |
| Recording Layer | $Ag_5In_{10}Sb_{47}Te_{30}$ (atm %) | 200 |
| Second Heat-resistant Protective Layer | $(ZnS)_{50}(ZnO)_{20}(SiO_2)_{30}$ (mol %) | 250 |
| Light Reflection and Heat Dissipation Layer | Al alloy | 1000 |
| Example 7 | | |
| First Heat-resistant Protective Layer | $(ZnS)_{70}(ZnO)_{20}(SiO_2)_{10}$ (mol %) | 1800 |
| Recording Layer | $Ag_5In_{10}Sb_{46}Te_{37}N_2$ (atm %) | 200 |
| Second Heat-resistant Protective Layer | $(ZnS)_{70}(ZnO)_{20}(SiO_2)_{10}$ (mol %) | 275 |
| Light Reflection and Heat Dissipation Layer | Al alloy | 1000 |
| Example 8 | | |
| First Heat-resistant Protective Layer | $(ZnS)_{70}(ZnO)_{20}(SiO_2)_{10}$ (mol %) | 1800 |
| Recording Layer | $Ag_5In_{10}Sb_{46.9}Te_{30}Cl_{0.1}$ (atm %) | 200 |
| Second Heat-resistant Protective Layer | $(ZnS)_{70}(ZnO)_{20}(SiO_2)_{10}$ (mol %) | 275 |
| Light Reflection and Heat Dissipation Layer | Al alloy | 1000 |
| Example 9 | | |
| First Heat-resistant Protective Layer | $(ZnS)_{70}(ZnO)_{20}(SiO_2)_{10}$ (mol %) | 1800 |
| Recording Layer | $Ag_5In_{10}Sb_{48.9}Te_{37}N_2Cl_{0.1}$ (atm %) | 200 |
| Second Heat-resistant Protective Layer | $(ZnS)_{70}(ZnO)_{20}(SiO_2)_{10}$ (mol %) | 275 |
| Light Reflection and Heat Dissipation Layer | Al alloy | 1000 |
| Example 10 | | |
| First Heat-resistant Protective Layer | $(ZnS)_{70}(ZnO)_{10}(SiO_2)_{20}$ (mol %) | 1800 |
| Recording Layer | $(Ag_3SbS_3)_{95}Zn_3$ (atm %) | 280 |
| Second Heat-resistant Protective Layer | $(ZnS)_{70}(ZnO)_{10}(SiO_2)_{20}$ (mol %) | 310 |
| Light Reflection and Heat Dissipation Layer | Al alloy | 800 |
| Example 11 | | |
| First Heat-resistant | $(ZnS)_{70}(ZnO)_{10}(SiO_2)_{20}$ | 1800 |

TABLE 1-continued

| | Composition | Thickness (Å) |
|---|---|---|
| Protective Layer | (mol %) | |
| Recording Layer | $(Ag_3SbS_3)_{95}Zn_5$ (atm %) | 300 |
| Second Heat-resistant Protective Layer | $(ZnS)_{70}(ZnO)_{10}(SiO_2)_{20}$ (mol %) | 300 |
| Light Reflection and Heat Dissipation Layer | Al—Mg—Si | 800 |
| Example 12 | | |
| First Heat-resistant Protective Layer | $(ZnS)_{70}(ZnO)_{10}(SiO_2)_{20}$ (mol %) | 1800 |
| Recording Layer | $(AgAsS)_{90}Ge_{10}$ (atm %) | 300 |
| Second Heat-resistant Protective Layer | $(ZnS)_{70}(ZnO)_{10}(SiO_2)_{20}$ (mol %) | 300 |
| Light Reflection and Heat Dissipation Layer | Al—Mg—Si | 800 |
| Example 13 | | |
| First Heat-resistant Protective Layer | $(ZnS)_{70}(ZnO)_{10}(SiO_2)_{20}$ (mol %) | 1800 |
| Recording Layer | $(Ag_3SbS_3)_{94}Zn_3Sn_3$ (atm %) | 300 |
| Second Heat-resistant Protective Layer | $(ZnS)_{70}(ZnO)_{10}(SiO_2)_{20}$ (mol %) | 280 |
| Light Reflection and Heat Dissipation Layer | Al—Mg—Si | 800 |
| Comparative Example 1 | | |
| First Heat-resistant Protective Layer | $(ZnS)_{80}(SiO_2)_{20}$ (mol %) | 1800 |
| Recording Layer | $Ag_5In_{10}Sb_{47}Te_{30}$ (atm %) | 200 |
| Second Heat-resistant Protective Layer | $(ZnS)_{80}(SiO_2)_{20}$ (mol %) | 250 |
| Light Reflection and Heat Dissipation Layer | Al alloy | 1000 |
| Comparative Example 2 | | |
| First Heat-resistant Protective Layer | $(ZnS)_{80}(SiO_3)_{20}$ (mol %) | 1800 |
| Recording Layer | $(Ag_3SbS_3)_{0.5}Zn_5$ (atm %) | 300 |
| Second Heat-resistant Protective Layer | $(ZnS)_{60}(SiO_2)_{20}$ (mol %) | 300 |
| Light Reflection and Heat Dissipation Layer | Al alloy | 800 |

TABLE 2

First and Second Heat-resistant Protective Layers

| | Composition (mol %) | Thermal Conductivity (w/m·k) | Refractive Index |
|---|---|---|---|
| Ex. 1 | $(ZnS)_{90}(ZnO)_5(SiO_2)_5$ | 1.20 | 2.02 |
| Ex. 2 | $(ZnS_2)_{90}(ZnO)_{10}(SiO_2)_{10}$ | 6.2 | 1.95 |
| Ex. 3 | $(ZnS)_{70}(ZnO)_{20}(SiO_2)_{10}$ | 11.9 | 1.97 |
| Ex. 4 | $(ZnS)_{50}(ZnO)_{30}(SiO_2)_{20}$ | 18.4 | 1.82 |
| Ex. 5 | $(ZnS)_{30}(ZnO)_{50}(SiO_2)_{20}$ | 23.8 | 1.91 |
| Ex. 6 | $(ZnS)_{50}(ZnO)_{20}(SiO_2)_{30}$ | 13.3 | 1.77 |
| Ex. 7 | $(ZnS)_{70}(ZnO)_{20}(SiO_2)_{10}$ | 11.9 | 1.97 |
| Ex. 8 | $(ZnS)_{70}(ZnO)_{20}(SiO_2)_{10}$ | 11.9 | 1.97 |
| Ex. 9 | $(ZnS)_{70}(ZnO)_{30}(SiO_2)_{10}$ | 11.9 | 1.97 |
| Ex. 10 | $(ZnS)_{70}(ZnO)_{10}(SiO_2)_{20}$ | 12.0 | 1.98 |
| Ex. 11 | $(ZnS)_{70}(ZnO)_{10}(SiO_2)_{20}$ | 12.0 | 1.98 |
| Ex. 12 | $(ZnS)_{70}(ZnO)_{10}(SiO_2)_{20}$ | 12.0 | 1.98 |
| Ex. 13 | $(ZnS)_{70}(ZnO)_{10}(SiO_2)_{20}$ | 12.0 | 1.98 |
| Comp. Ex. 1 | $(ZnS)_{90}(SiO_2)_{20}$ | 0.91 | 2.18 |
| Comp. Ex. 2 | $(ZnS)_{90}(SiO_2)_{20}$ | 0.91 | 2.18 |

TABLE 3

Example 1

| Number of repeatable overwriting times | Recording power Jitter (ns) | | | | |
|---|---|---|---|---|---|
| | 9 mW | 10 mW | 11 mW | 12 mW | 13 mW |
| 1 | 9.6 | 8.5 | 8.1 | 7.6 | 8.2 |
| 100 | 11.1 | 9.3 | 8.9 | 8.8 | 9.3 |
| 500 | 13.2 | 10.1 | 9.9 | 10.1 | 11.2 |
| 1,000 | 14.8 | 12.2 | 11.8 | 12.3 | 13.1 |
| 3,000 | 16.2 | 13.8 | 13.2 | 14.1 | 18.3 |
| 5,000 | 22.1 | 18.2 | 17.6 | 18.9 | x |
| 10,000 | x | x | x | x | x |
| 15,000 | — | — | — | — | — |
| 20,000 | — | — | — | — | — |
| 30,000 | — | — | — | — | — |

"x" denotes that recording was impossible.

TABLE 4

Example 2

| Number of repeatable overwriting times | Recording power Jitter (ns) | | | | |
|---|---|---|---|---|---|
| | 9 mW | 10 mW | 11 mW | 12 mW | 13 mW |
| 1 | 10.7 | 9.2 | 8.9 | 7.9 | 7.2 |
| 100 | 11.9 | 9.8 | 9.5 | 8.9 | 7.9 |
| 500 | 13.6 | 10.8 | 10.7 | 9.9 | 9.8 |
| 1,000 | 14.8 | 12.3 | 12.3 | 12.1 | 12.6 |
| 3,000 | 16.5 | 13.7 | 13.8 | 13.2 | 14.1 |
| 5,000 | 21.2 | 17.8 | 18.2 | 14.9 | 18.3 |
| 10,000 | 33.2 | 30.1 | 30.4 | 27.5 | x |
| 15,000 | x | x | x | x | x |
| 20,000 | — | — | — | — | — |
| 30,000 | — | — | — | — | — |

"x" denotes that recording was impossible.

TABLE 5

Example 3

| Number of repeatable overwriting times | Recording power Jitter (ns) | | | | |
|---|---|---|---|---|---|
| | 9 mW | 10 mW | 11 mW | 12 mW | 13 mW |
| 1 | 11.5 | 10.4 | 9.6 | 8.4 | 7.7 |
| 10 | 12.1 | 9.6 | 8.8 | 7.6 | 7.2 |
| 500 | 13.6 | 9.7 | 9.2 | 8.8 | 8.3 |
| 1,000 | 14.5 | 11.1 | 10.9 | 9.9 | 9.8 |
| 3,000 | 17.7 | 13.1 | 12.6 | 11.6 | 13.6 |
| 5,000 | 19.2 | 14.4 | 13.3 | 12.5 | 14.3 |
| 10,000 | 24.3 | 15.0 | 13.9 | 13.2 | 14.9 |
| 15,000 | 26.9 | 18.8 | 14.4 | 16.2 | 19.3 |
| 20,000 | 29.9 | 22.3 | 15.1 | 21.3 | x |
| 30,000 | 33.1 | 25.6 | 17.7 | x | — |

"x" denotes that recording was impossible.

TABLE 6

Example 4

| Number of repeatable overwriting times | Recording power Jitter (ns) | | | | |
|---|---|---|---|---|---|
| | 10 mW | 11 mW | 12 mW | 13 mW | 14 mW |
| 1 | 11.9 | 10.7 | 8.9 | 8.2 | 7.8 |
| 100 | 10.1 | 9.8 | 8.1 | 7.7 | 7.3 |

TABLE 6-continued

Example 4

| Number of repeatable | Recording power Jitter (ns) | | | | |
|---|---|---|---|---|---|
| overwriting times | 10 mW | 11 mW | 12 mW | 13 mW | 14 mW |
| 500 | 10.5 | 10.2 | 9.0 | 8.8 | 8.6 |
| 1,000 | 10.9 | 11.3 | 10.1 | 9.7 | 10.7 |
| 3,000 | 11.2 | 12.4 | 11.3 | 11.1 | 12.9 |
| 5,000 | 13.3 | 13.1 | 12.2 | 12.4 | 14.0 |
| 10,000 | 14.4 | 13.9 | 13.0 | 13.2 | 14.7 |
| 15,000 | 15.1 | 14.1 | 13.9 | 14.7 | 18.1 |
| 20,000 | 15.5 | 14.7 | 14.5 | 15.9 | 26.6 |
| 30,000 | 16.3 | 15.1 | 15.4 | 18.3 | x |

"x" denotes that recording was impossible.

TABLE 7

Example 5

| Number of repeatable | Recording power Jitter (ns) | | | | |
|---|---|---|---|---|---|
| overwriting times | 11 mW | 12 mW | 13 mW | 14 mW | 15 mW |
| 1 | 18.1 | 15.2 | 12.1 | 10.1 | 9.1 |
| 100 | 17.9 | 14.7 | 11.8 | 9.3 | 8.8 |
| 500 | 18.3 | 14.8 | 11.8 | 9.5 | 9.6 |
| 1,000 | 18.7 | 14.8 | 11.9 | 9.8 | 10.3 |
| 3,000 | 19.1 | 15.0 | 12.1 | 10.3 | 12.6 |
| 5,000 | 19.4 | 15.4 | 12.2 | 11.9 | 13.7 |
| 10,000 | 19.7 | 15.9 | 12.3 | 13.2 | 14.2 |
| 15,000 | 20.0 | 16.2 | 12.7 | 14.4 | 16.7 |
| 20,000 | 20.2 | 16.6 | 12.9 | 15.9 | 22.3 |
| 30,000 | 20.4 | 17.3 | 13.4 | 18.4 | 33.8 |

TABLE 8

Example 6

| Number of repeatable | Recording power Jitter (ns) | | | | |
|---|---|---|---|---|---|
| overwriting times | 10 mW | 11 mW | 12 mW | 13 mW | 14 mW |
| 1 | 10.3 | 9.3 | 8.3 | 7.9 | 7.4 |
| 100 | 9.8 | 8.8 | 7.9 | 7.6 | 7.2 |
| 500 | 10.9 | 9.9 | 8.9 | 8.8 | 9.2 |
| 1,000 | 12.1 | 12.2 | 10.4 | 11.6 | 12.9 |
| 3,000 | 13.2 | 13.1 | 12.5 | 13.9 | 14.6 |
| 5,000 | 14.1 | 14.0 | 14.4 | 15.5 | 17.1 |
| 10,000 | 14.9 | 15.5 | 17.2 | 19.2 | 20.2 |
| 15,000 | 17.1 | 18.2 | 19.6 | 22.3 | 25.6 |
| 20,000 | 19.3 | 22.2 | 26.6 | 27.5 | 29.3 |
| 30,000 | 25.6 | 27.2 | x | — | — |

"x" denotes that recording was impossible.

TABLE 9

Example 7

| Number of repeatable | Recording power Jitter (ns) | | | | |
|---|---|---|---|---|---|
| overwriting times | 9 mW | 10 mW | 11 mW | 12 mW | 13 mW |
| 1 | 11.3 | 10.1 | 9.2 | 8.2 | 7.5 |
| 100 | 11.7 | 9.2 | 8.4 | 7.3 | 7.1 |
| 500 | 12.1 | 9.2 | 8.7 | 7.9 | 7.7 |
| 1,000 | 12.6 | 9.7 | 9.3 | 8.5 | 8.3 |
| 3,000 | 14.2 | 10.2 | 10.0 | 9.3 | 9.9 |
| 5,000 | 14.9 | 10.9 | 10.6 | 10.2 | 12.2 |

TABLE 9-continued

Example 7

| Number of repeatable | Recording power Jitter (ns) | | | | |
|---|---|---|---|---|---|
| overwriting times | 9 mW | 10 mW | 11 mW | 12 mW | 13 mW |
| 10,000 | 15.8 | 11.8 | 11.2 | 10.9 | 13.3 |
| 15,000 | 17.7 | 13.2 | 12.9 | 12.1 | 14.3 |
| 20,000 | 19.8 | 14.4 | 14.0 | 13.8 | 17.9 |
| 30,000 | 23.1 | 18.9 | 15.8 | 15.7 | 23.3 |

TABLE 10

Example 8

| Number of repeatable | Recording power Jitter (ns) | | | | |
|---|---|---|---|---|---|
| overwriting times | 9 mW | 10 mW | 11 mW | 12 mW | 13 mW |
| 1 | 12.3 | 10.9 | 10.2 | 8.8 | 8.0 |
| 100 | 12.4 | 10.1 | 9.9 | 8.1 | 7.6 |
| 500 | 14.0 | 10.5 | 10.2 | 8.8 | 8.2 |
| 1,000 | 14.9 | 11.7 | 11.1 | 9.6 | 9.2 |
| 3,000 | 18.1 | 13.7 | 12.9 | 10.7 | 11.7 |
| 5,000 | 19.5 | 14.8 | 13.8 | 11.9 | 12.5 |
| 10,000 | 25.1 | 15.5 | 14.4 | 13.7 | 16.8 |
| 15,000 | 27.2 | 19.3 | 15.0 | 17.3 | 22.3 |
| 20,000 | 30.3 | 22.8 | 15.7 | 24.7 | x |
| 30,000 | 31.2 | 26.3 | 17.6 | x | — |

"x" denotes that recording was impossible.

TABLE 11

Example 9

| Number of repeatable | Recording power Jitter (ns) | | | | |
|---|---|---|---|---|---|
| overwriting times | 8 mW | 9 mW | 10 mW | 11 mW | 12 mW |
| 1 | 12.7 | 11.4 | 10.9 | 9.6 | 8.8 |
| 100 | 12.9 | 10.8 | 10.3 | 8.9 | 8.2 |
| 500 | 13.3 | 11.3 | 10.6 | 9.2 | 8.5 |
| 1,000 | 13.7 | 11.6 | 11.0 | 9.5 | 8.9 |
| 3,000 | 14.5 | 12.1 | 11.5 | 10.1 | 9.5 |
| 5,000 | 15.8 | 13.0 | 12.3 | 10.7 | 10.3 |
| 10,000 | 17.2 | 14.1 | 13.2 | 11.4 | 11.2 |
| 15,000 | 19.3 | 15.2 | 14.4 | 12.2 | 12.4 |
| 20,000 | 21.4 | 16.3 | 15.1 | 13.1 | 13.5 |
| 30,000 | 24.4 | 17.7 | 16.3 | 14.2 | 14.9 |

TABLE 12

Comparative Example 1

| Number of repeatable | Recording power Jitter (ns) | | | | |
|---|---|---|---|---|---|
| overwriting times | 9 mW | 10 mW | 11 mW | 12 mW | 13 mW |
| 1 | 11.1 | 9.3 | 8.9 | 10.6 | 14.6 |
| 100 | 13.2 | 10.1 | 9.7 | 12.3 | 15.7 |
| 500 | 14.8 | 12.2 | 11.8 | 13.1 | 19.1 |
| 1,000 | 18.2 | 13.8 | 13.2 | 14.3 | 34.2 |
| 3,000 | x | x | x | x | x |
| 5,000 | — | — | — | — | — |
| 10,000 | — | — | — | — | — |
| 15,000 | — | — | — | — | — |
| 20,000 | — | — | — | — | — |
| 30,000 | — | — | — | — | — |

"x" denotes that recording was impossible.

TABLE 13

| Characteristics | Recording Power (Pw/Pa) (mW) | | | |
|---|---|---|---|---|
| | Example 10 | | | |
| | 19/10 | 20/10 | 21/10 | 22/10 |
| C/N (dβ) | 48 | 48 | 49 | 50 |
| Erasing ratio (dβ) | 24 | 25 | 26 | 27 |
| Reflectivity of erased portion (%) | 70 | 70 | 69 | 68 |
| Reflectivity of recorded portion (%) | 28 | 27 | 26 | 24 |
| Contrast | 0.6 | 0.61 | 0.62 | 0.65 |
| Repeatable number of overwriting times | 60 | 60 | 58 | 57 |
| | Example 11 | | | |
| | 21/10 | 22/10 | 23/10 | 24/10 |
| C/N (dβ) | 48 | 48 | 49 | 50 |
| Erasing ratio (dβ) | 24 | 25 | 26 | 27 |
| Reflectivity of erased portion (%) | 70 | 70 | 69 | 68 |
| Reflectivity of recorded portion (%) | 28 | 28 | 27 | 26 |
| Contrast | 0.6 | 0.6 | 0.61 | 0.62 |
| Repeatable number of overwriting times | 80 | 78 | 77 | 75 |
| | Example 12 | | | |
| | 20/10 | 21/10 | 22/10 | 23/10 |
| C/N (dβ) | 47 | 48 | 48 | 49 |
| Erasing ratio (dβ) | 23 | 25 | 25 | 26 |
| Reflectivity of erased portion (%) | 71 | 70 | 70 | 69 |
| Reflectivity of recorded portion (%) | 31 | 30 | 30 | 29 |
| Contrast | 0.56 | 0.57 | 0.57 | 0.58 |
| Repeatable number of overwriting times | 80 | 80 | 79 | 78 |
| | Example 13 | | | |
| | 17/10 | 18/10 | 19/10 | 20/10 |
| C/N (dβ) | 48 | 49 | 50 | 51 |
| Erasing ratio (dβ) | 25 | 25 | 26 | 26 |
| Reflectivity of erased portion (%) | 69 | 68 | 68 | 67 |
| Reflectivity of recorded portion (%) | 30 | 29 | 28 | 27 |
| Contrast | 0.57 | 0.57 | 0.57 | 0.60 |
| Repeatable number of overwriting times | 95 | 93 | 93 | 92 |
| | Comparative Example 2 | | | |
| | 25/10 | 26/10 | 27/10 | 28/10 |
| C/N (dβ) | 45 | 46 | 46 | 47 |
| Erasing ratio (dβ) | 22 | 22 | 23 | 24 |

TABLE 13-continued

| Reflectivity of erased portion (%) | 68 | 68 | 69 | 68 |
|---|---|---|---|---|
| Reflectivity of recorded portion (%) | 29 | 28 | 28 | 27 |
| Contrast | 0.57 | 0.59 | 0.59 | 0.60 |
| Repeatable number of overwriting times | 20 | 20 | 19 | 19 |

Japanese Patent Application No. 08-040205 filed Feb. 27, 1996 is hereby incorporated by reference.

What is claimed is:

1. An optical information recording medium capable of recording information therein and erasing recorded information therefrom, and being initialized, comprising:

a substrate with guide grooves thereon; a recording layer provided on said substrate, comprising a recording material of which phase is reversibly changeable from a stable state to a semistable state and; vice versa, said recording material comprising Ag, In, Sb and Te combined with chlorine;

a heat-resistant dielectric protective layer provided on said recording layer, comprising a protective material which comprises ZnS, ZnO and $SiO_2$; and a light reflection and heat dissipation layer provided on said heat-resistant dielectric protective layer.

2. The optical information recording medium as claimed in claim 1, wherein the composition ratio of ZnS, ZnO and $SiO_2$ in said heat-resistant dielectric protective layer is represented by formula (I):

$$(ZnS)_\alpha (ZnO)_\beta (SiO_2)_\gamma \qquad (I)$$

wherein $30 \leq \alpha \leq 90$, $5 \leq \beta \leq 50$ and $5 \leq \gamma \leq 30$, and $\alpha+\beta+\gamma=100$ mole %.

3. The optical information recording medium as claimed in claim 1, wherein said protective material has a thermal conductivity in a range of 1.2 W/m·k to 24.0 W/m·k.

4. The optical information recording medium as claimed in claim 1, wherein said recording material further comprises nitrogen.

5. The optical information recording medium as claimed in claim 1, wherein recording is performed in said amorphous state, and initialization and erasing are preformed in said crystalline state.

6. The optical information recording medium as claimed in claim 1, further comprising an additional heat-resistant dielectric protective layer comprising a protective material which comprises Zn, St, S and O, which is interposed between said substrate and said recording layer.

* * * * *

UNITED STATES PATENT AND TRADEMARK OFFICE
CERTIFICATE OF CORRECTION

PATENT NO.    : 6,221,557 B1
DATED         : April 24, 2001
INVENTOR(S)   : Makoto Harigaya et al.

It is certified that error appears in the above-identified patent and that said Letters Patent is hereby corrected as shown below:

Column 1,
Line 38, "such as SiO and $Al_2O$," should read -- such as $SiO_2$ and $Al_2O_3$, --.

Column 2,
Line 57, "and St" should read -- and S, --;
Line 60, "somistable state." should read -- semistable rate. --.

Column 3,
Line 7, "Go," should read -- Ge, --;
Line 19, "an the" should read -- as the --;
Line 47, "minimum litters" should read -- minimum jitters --;
Line 55, "an desired." should read -- as desired. --;
Line 57, "laser beam" should read -- laser beams --.

Column 4,
Line 13, "in highly" should read -- is highly --;
Line 39, "of Sis,," should read -- of $SiO_2$, --.

Column 5,
Line 7, "and To be" should read -- and Te be --;
Line 21, "a 1 high" should read -- and high --;
Line 35, "Go and Sn." should read -- Ge and Sn. --;
Line 58, "$(Ag_3AsS_3)_xM_{100-x}$" should read -- $(Ag_3S_3)_xM_{100-x}$ --;
Line 60, "Go," should read -- Ge --.

Column 6,
Line 15, "poly-ethylene resin," should read -- polyethylene resin, --;
Line 34, "ZnS•ZnO $SiO_2$" should read -- ZnS•ZnO•$SiO_2$ --.

Column 7,
Line 55, "EPM" should read -- EFM --.

Column 8,
Line 9, "in particular," should read -- In particular --.

Column 10,
Lines 37, 43 and 57, "Light Reflection and" should read -- Light Reflection and Heat Dissipation Layer --;

UNITED STATES PATENT AND TRADEMARK OFFICE
CERTIFICATE OF CORRECTION

PATENT NO. : 6,221,557 B1
DATED : April 24, 2001
INVENTOR(S) : Makoto Harigaya et al.

It is certified that error appears in the above-identified patent and that said Letters Patent is hereby corrected as shown below:

Column 11,
Line 37, "$(ZnS)_{80}(SiO_3)_{20}$" should read -- $(ZnS)_{80}(SiO_2)_{20}$ --;
Line 39, "$(Ag_3SbS_3)_{0.5}Zn_5$" should read -- $(Ag_3SbS_3)_{95}Zn_5$ --;
Line 53, "1.95" should read -- 1.85 --;
Line 56, "1.91" should read -- 1.81 --.

Column 12,
Line 9, "8.2" should read -- 8.3 --;
Line 47, "10" should read -- 100 --.

Column 14,
Line 20, "9mW 10mW 11mW 12mW 13mW" should read -- 8mW 9mW 10mW 11mW 12mW --;
Line 29, "31.2" should read -- 34.2 --.

Column 15,
Line 3, "(Pw/Pa)" should read -- (Pw/Pe) --.

Column 16,
Line 21, "and; vice versa," should read -- and vice versa, --;
Line 23, "and Te" should read -- and Te; --;
Line 52, "St," should read -- Si, --.

Signed and Sealed this

Second Day of April, 2002

*Attest:*

JAMES E. ROGAN
*Attesting Officer*       *Director of the United States Patent and Trademark Office*